Figure 1:
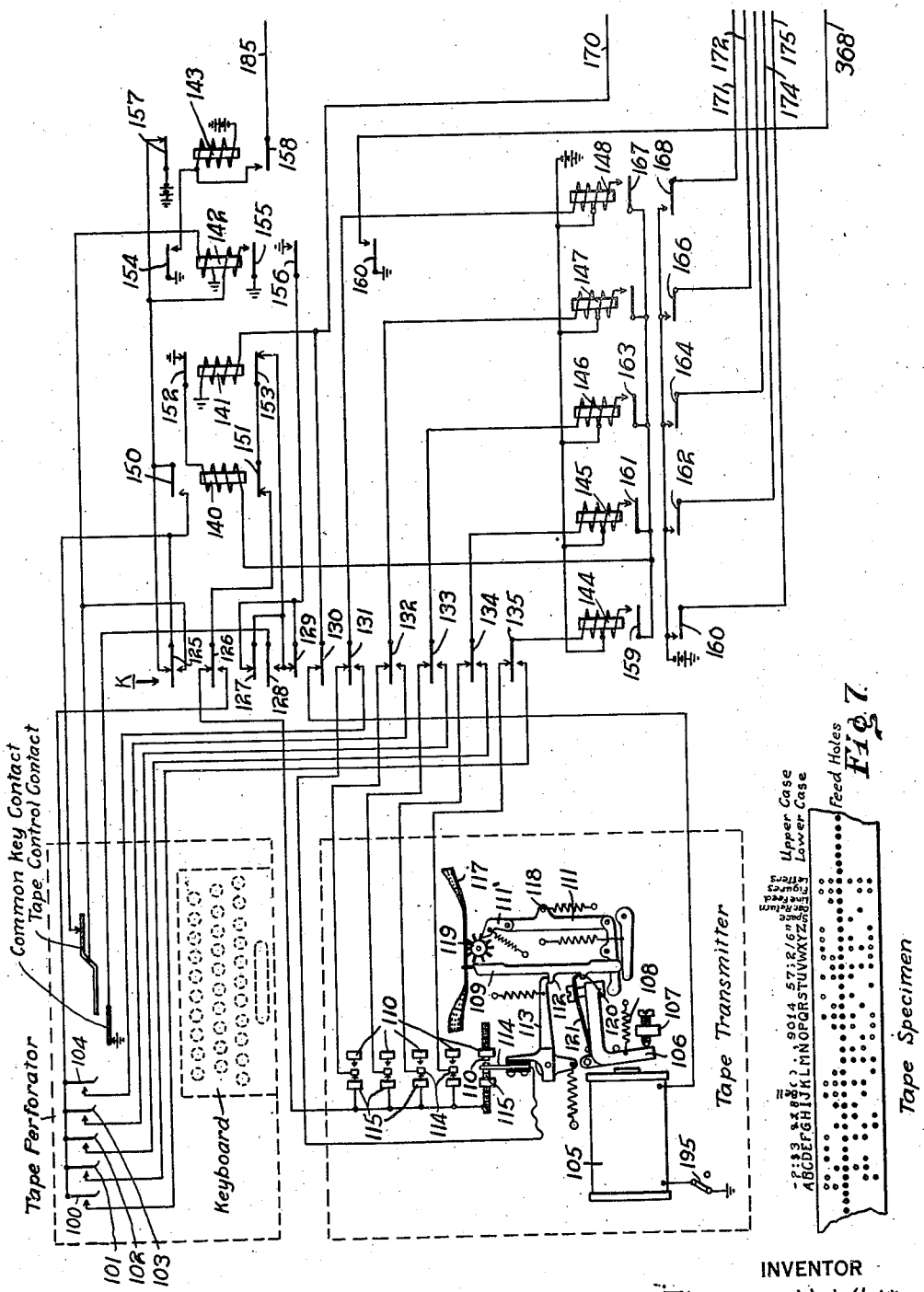

June 24, 1930.  T. U. WHITE  1,765,472
TELEGRAPH SYSTEM
Original Filed Feb. 19, 1925   6 Sheets-Sheet 2

INVENTOR
Thomas U. White
BY
*J. E. Foster*
ATTORNEY

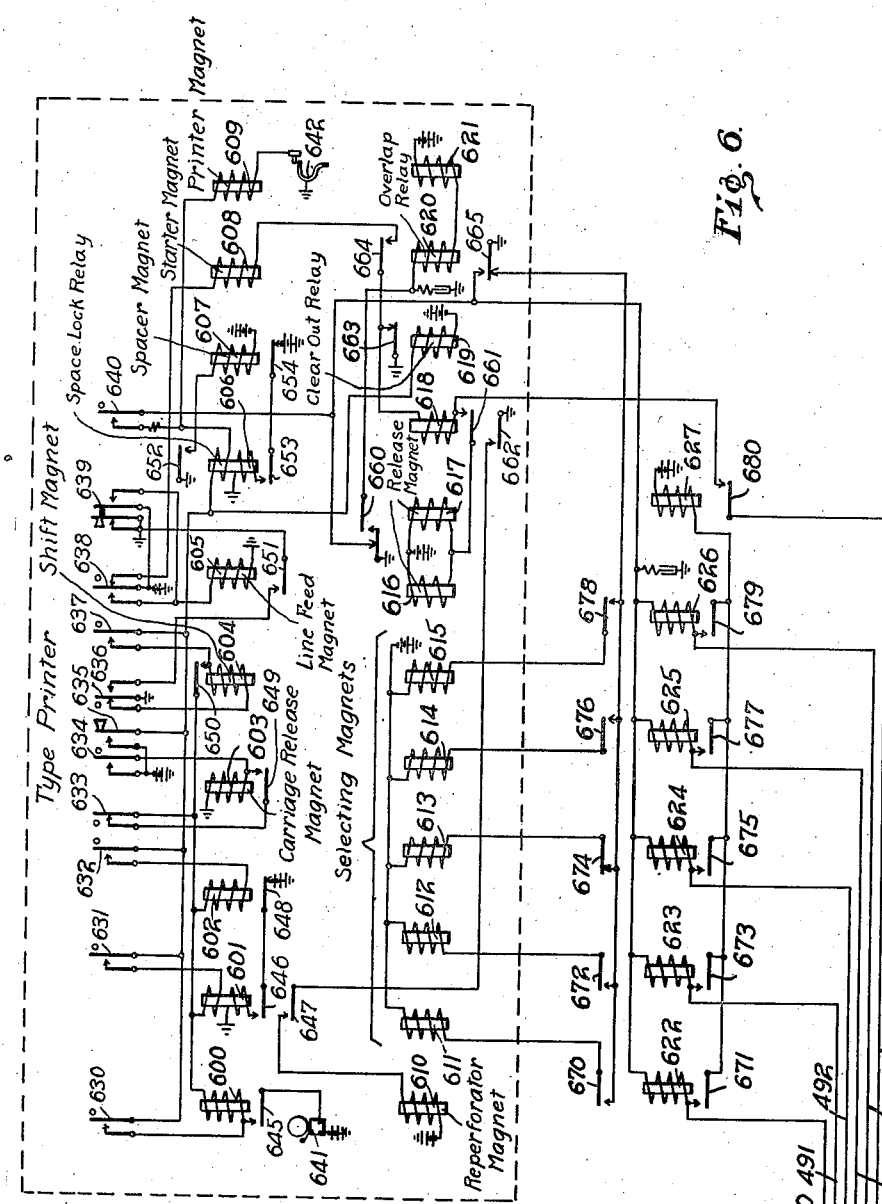

Patented June 24, 1930

1,765,472

UNITED STATES PATENT OFFICE

THOMAS U. WHITE, OF GENOA, ILLINOIS, ASSIGNOR, BY MESNE ASSIGNMENTS, TO WESTINGHOUSE ELECTRIC & MANUFACTURING COMPANY, A CORPORATION OF PENNSYLVANIA

TELEGRAPH SYSTEM

Application filed February 19, 1925, Serial No. 10,232. Renewed October 18, 1928.

My invention relates, in general, to telegraph systems, and more particularly to systems that employ automatic sending and receiving apparatus of the type employed in printing telegraphy.

One of the objects of my invention is to provide groups of relays at the sending and receiving stations that are adapted to replace the ordinary synchronously-operating distributers that are now widely used.

Another object of my invention is to provide a group of relays that may, as stated above, replace the ordinary distributer in automatic printing telegraph systems which will function in conjunction with automatic apparatus of any standard type.

Another object of my invention is to provide a group of relays at the transmitting and receiving stations, respectively, that may be operated synchronously in a predetermined sequence by the use of a so-called driving circuit.

Another object of my invention is to provide an improved driving circuit for operating the relays in the groups at the sending and receiving stations simultaneously in a predetermined sequence.

Another object of my invention is to provide a driving circuit, of the type set forth, that will not cause defective operation of the relay selecting apparatus at the transmitting and receiving stations from inductive disturbances of any character.

A still further object of my invention is to provide relay apparatus for increasing the speed at which the symbols constituting the various letters may be transmitted.

There are other objects of the invention which, together with those set forth above, will be explained in the detailed specification which is to follow.

Referring now to the drawings, comprising Figures 1 to 7, inclusive, I have shown, by means of the usual conventional diagrams, sufficient of the circuits and apparatus to enable my invention to be readily explained and understood.

Figure 2:
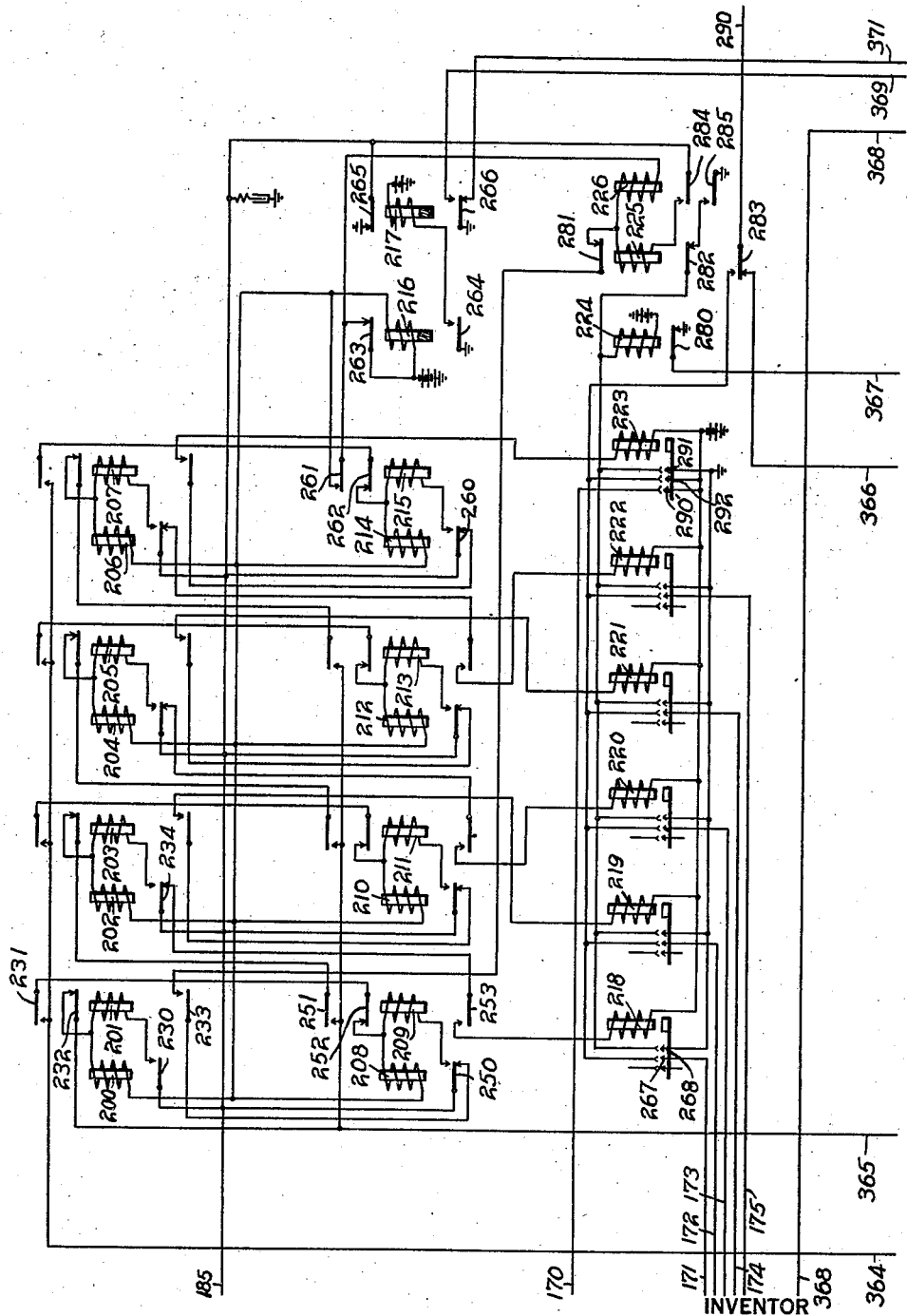
Figure 3:
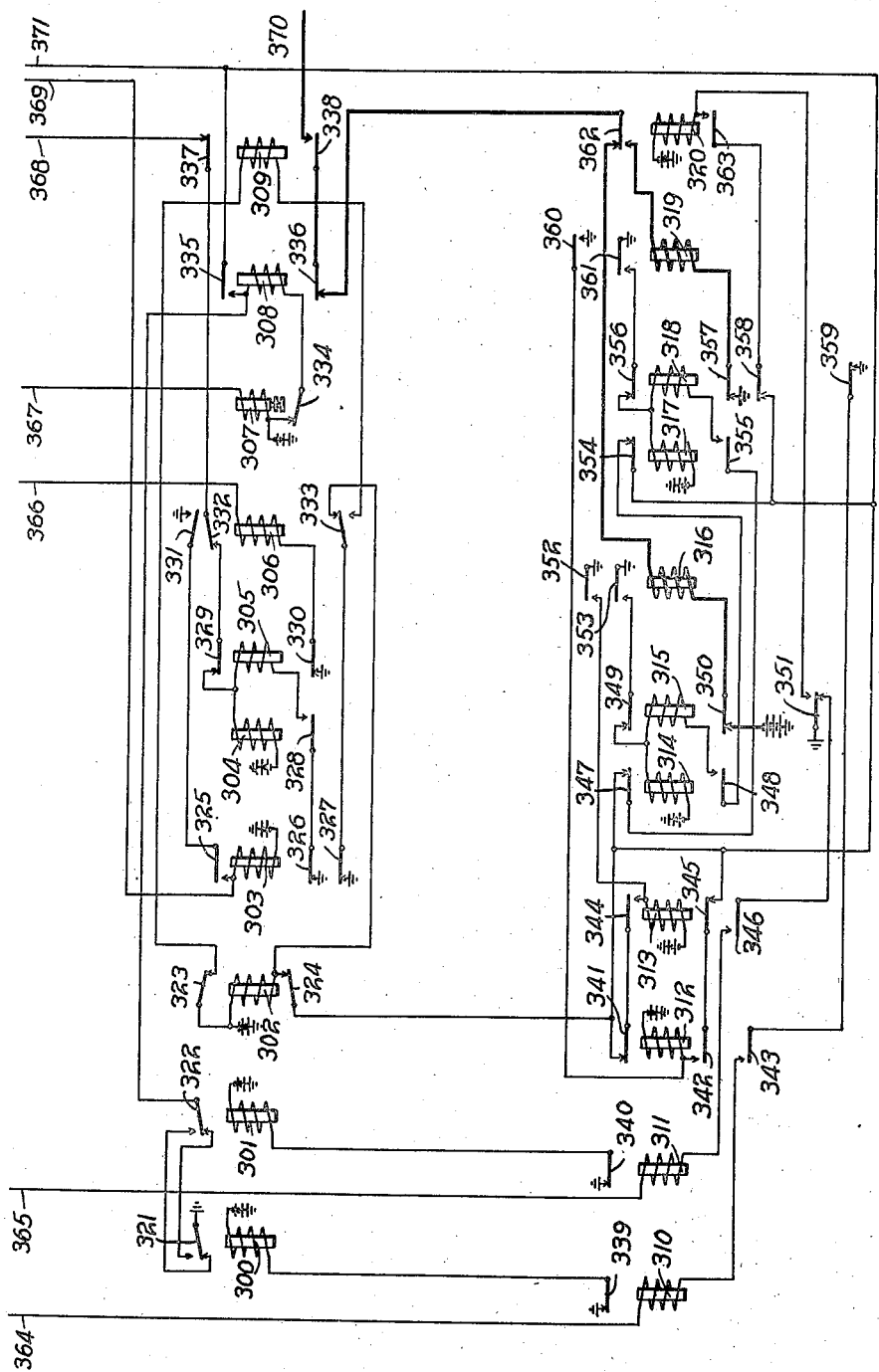
Figure 4:
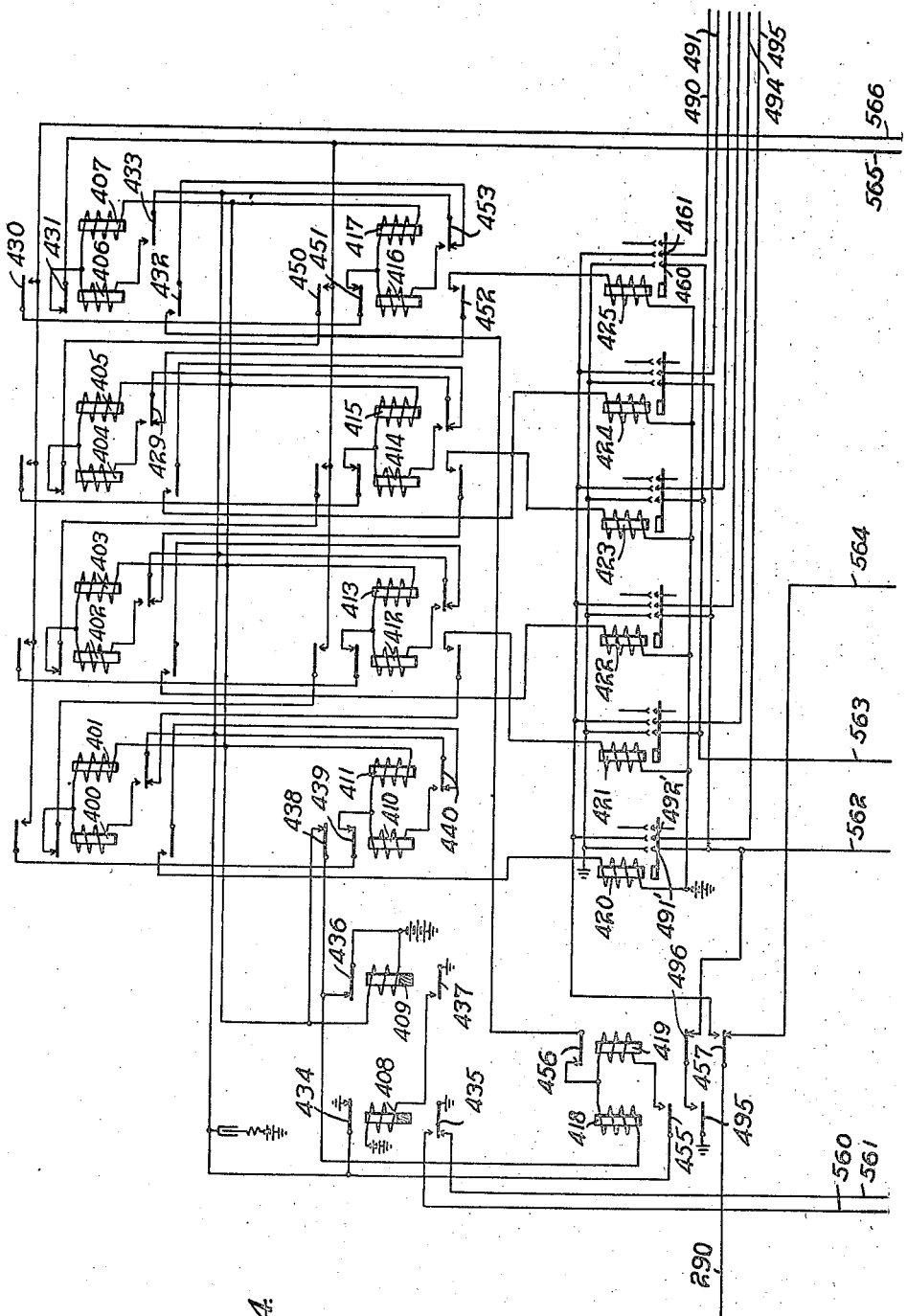
Figure 5:
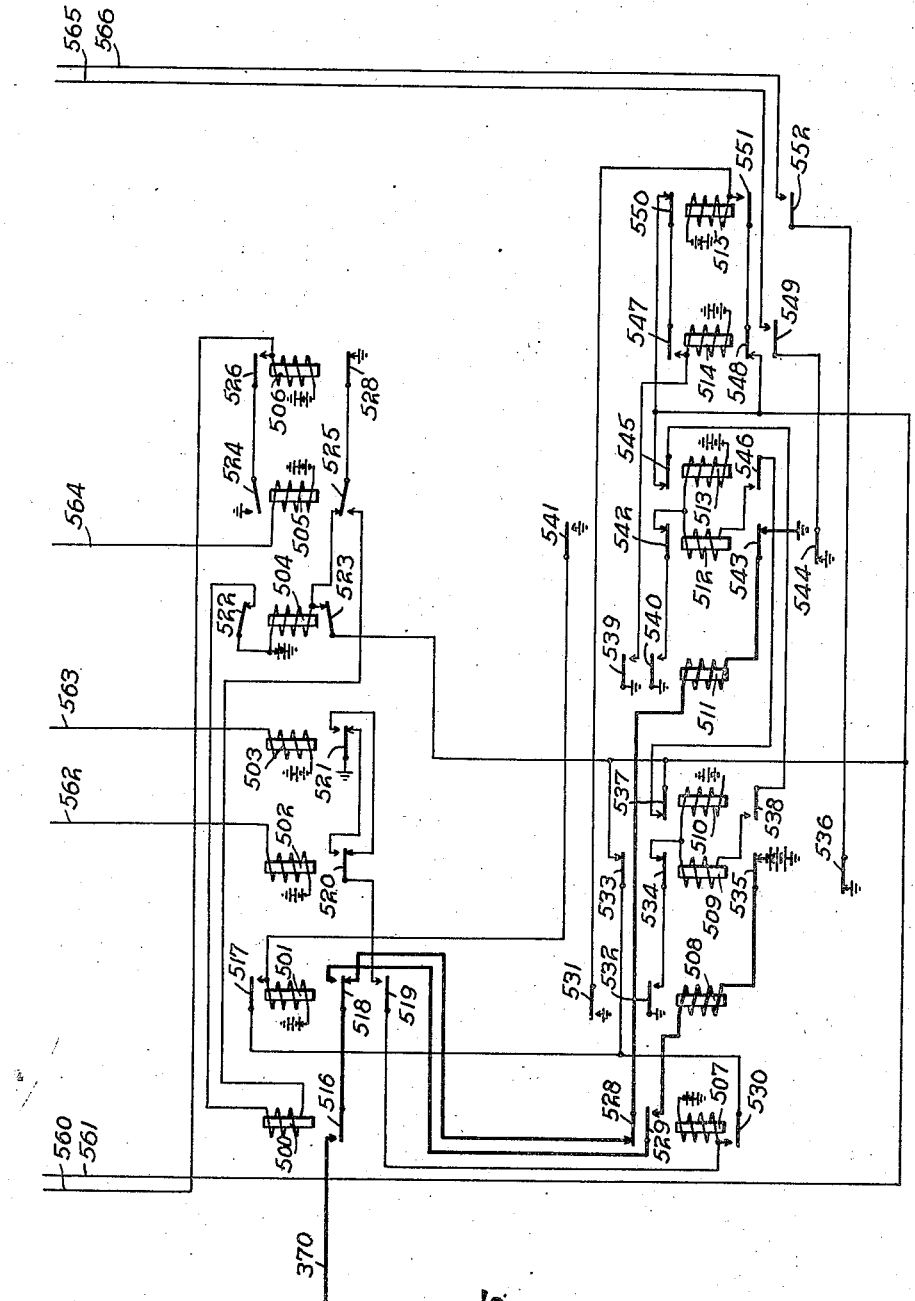

The apparatus and circuits shown in Figs. 1 to 3, inclusive, are those located at the transmitting station, while the apparatus and circuits shown in Figs. 4 to 6, inclusive, are those located at the receiving station.

In practicing my invention, I provide automatic sending apparatus of the usual type at the transmitting station, comprising a perforator and an automatic transmitter. To replace the usual distributer, I provide, at the transmitting station, a group of counting relays that control a group of selecting relays. The counting relays are controlled, in turn, by that portion of a driving circuit that is located at the transmitting station.

At the receiving station, I provide an automatic printer that may be of any well-known type. To replace the distributer at the receiving station, I employ a group of counting relays, corresponding in number to the number of counting relays at the transmitting station, that are adapted to control a group of selecting relays. The counting relays are controlled by that portion of the driving circuit that is located at the receiving station.

Briefly, the operation of my invention proceeds as follows: When the operator at the transmitting station operates the keyboard perforator, characters are translated by the usual operation of the perforator into perforations in a tape. The perforating of this tape initiates the operation of the driving circuit, and also of the automatic transmitter. By the functioning of the tape transmitter, circuits are prepared in the usual manner for connecting the potentials to the signalling circuit when the selecting relays are energized by the driving circuit, as will be described. The driving circuit is immediately operated to bring about the operation of the relays in the counting relay groups at both the transmitting and receiving stations in a definite sequence. The operation of these relays controls the operation of the selecting relays in a definite sequence.

There are six selecting relays in the system described. Five of these selecting relays correspond to the five positions of the distributer in the five-unit code system. The sixth relay is used in the same manner as the sixth position in the distributer to control the resetting of the apparatus.

The simultaneous energization of corresponding selecting relays at the transmitting and receiving stations causes the potentials that have been set up by the operation of the tape transmitter to be sent in a definite sequence over the signalling circuit and to the proper selecting relays in the type printer at the receiving station. The type printer functions in the usual manner to determine the letter or character that is to be printed and causes the printing of such character upon the operation of the sixth relay in the selecting relay group.

Referring now to the drawings, in Fig. 1 is shown, within the dotted rectangle in the upper left-hand corner of the sheet, a diagrammatic view of the tape perforator and keyboard. This perforator may be of any well known type—for example, the type employed by the Western Union Telegraph Company—which has contacts 100 to 104, inclusive, that are adapted to be selected by the operation of the type keys to control the functioning of the transmitting circuits directly without the use of the automatic transmitter. This tape perforator is provided with a common key contact and a tape control contact. The common key contact is operated upon the depression of each key of the keyboard. The tape control contact is operated when the automatic transmitter has caught up, so to speak, with the operation of the perforator, that is, when all the messages have been sent.

The dotted rectangle shown in lower left-hand corner of Fig. 1 represents the automatic transmitting apparatus. This apparatus may be of any well known type, although, in the present case, the type employed by the Western Union Telegraph Company has been illustrated. The mechanism in operation of this type of tape transmitter is thought to be so well known that no description of the mechanical parts will be given at this point, but the operation of this transmitter will be described briefly when the operation of the system is explained.

A cam switch K is provided for changing the circuits of the tape perforator so as to enable it to directly control the transmitting operation without the aid of the tape transmitter. This switch may be of the usual cam type.

Relays 140 to 143, inclusive, may be of any well-known type, such as those employed in the automatic telephone art. Relays 144 to 148, inclusive, are sending relays and are operated either directly from the tape perforator or from the tape transmitter.

Relays 200 to 215, inclusive, (Fig. 2), comprise the relays of the counting relay group at the transmitting station. Relays 216 and 217 are slow-acting relays of the usual type. Relays 218 to 223, inclusive, comprise the group of selecting relays at the transmitting station. Relays 224 to 226, inclusive, control certain operations of the driving circuit, as will appear.

Relays 300 to 320, inclusive, of Fig. 3, comprise the driving circuit at the transmitting station. All of these relays are of the usual type, with the exception of the relay 307. The relay 307 is a special type of slow-acting relay arranged so that its time constant may be varied by the addition of copper slugs.

In Fig. 4, relays 400 to 407, inclusive, and 410 to 417, inclusive, comprise the relay counting group at the receiving station. Relays 420 to 425, inclusive, comprise the selecting relay group at the receiving station. Relays 408 and 409 are slow-acting relays. Relays 418 and 419 control the driving circuit at the receiving station in a manner that will appear hereinafter.

In Fig. 5, relays 500 to 515, inclusive, comprise the driving circuit at the receiving station.

In Fig. 6, there is indicated diagrammatically the circuit diagram of a type printer of a kind that is employed by the Western Union Telegraph Company. Obviously, any other type may be used instead. Relays 622 to 627, inclusive, are selecting relays and control the functioning of the type printer.

It will be obvious that any usual type of relay may be employed in these circuits. I prefer, however, to employ, in the driving and selecting circuits, the type that is widely used in the automatic telephone art, changing these relays, however, so that they are adapted to respond to 110 volts, instead of the usual 48 volts.

In Fig. 7, there is shown a specimen of the tape employed in this system. All the letters and characters are indicated on the tape.

Having briefly described the apparatus shown in the drawings, I will now explain its detailed operation. For this purpose, it will be assumed that the operator at the transmitting station starts to operate the keyboard of the tape perforator. As a result of this action, the mechanical selecting pins of the perforator are operated to permit certain holes to be punched in the tape in accordance with each character that it is desired to transmit. This tape is then carried through the tape transmitter.

As soon as any operation of the keyboard occurs, the tape between the perforator and the transmitter becomes slack and the tape control contact is permitted to close. As a result of this operation, there is a circuit completed that extends from ground through the upper winding of the starting relay 142, tape control contact, spring 125 of cam switch K and its resting contact, and back contact and armature 157 to battery.

The starting relay 142 is energized to establish a locking circuit for itself at armature 155, to complete a circuit for the relay 143 at armature 154, and to place a ground potential upon the contacts 115 in the tape transmitter over a circuit that extends from ground by way of front contact and armature 156, spring 129 of cam switch K and its resting contact, back contact and armature 153, armature 151 and its back contact, spring 126 of switch K and its resting contact, to contact members 115 of the tape transmitter.

The transmitting mechanism of the tape transmitter comprises five contact-making members, similar to the contact-making member 114. These contact members are adapted to be controlled by five selecting pins in the same manner that the contact-making member 114 is controlled through the bell crank lever 113 by the selecting pin 109. That is, when the transmitter magnet is deenergized, the ratchet wheel 119 is advanced by the operation of the pawl 111 so that the next series of holes is presented to the ends of the five selecting pins. Whenever holes appear in the tape, the selecting pins penetrate these perforations, but the remaining selecting pins do not. With the selecting pins in their normal position beneath the tape, all the contact-making members, such as 114, are held in engagement with the so-called spacing contacts 110. When a perforation appears in the tape and the selecting pin corresponding to that perforation moves, the bell crank lever 113 is operated to move the contact-making member 114 into engagement with its marking contact member 115. The number of pins that penetrate the perforations determines the number of contact-making members that are brought into contact with their marking contact members. The remaining contact members are maintained in contact with the spacing contacts 110.

When the signals corresponding to the positions of the contact-making members in engagement with their marking contacts have been sent, a circuit is completed for the transmitter magnet 105. The transmitter magnet 105 is energized to attract its armature 106, thereby positioning the wheel 119 and drawing the five selecting pins 109 beneath the tape. When the magnet is deenergized, the wheel 119 has advanced so as to move the tape one space, and the selecting pins are permitted to again contact with the tape so that they may perform their function.

Now, when the relay 142 is energized, as before described, a circuit is completed at armature 156 that connects ground to all the marking contacts, such as 115. Consequently, those pins that have penetrated the perforations will have their associated contact-making members in engagement with the marking contact members 115.

It will be assumed that only the contact-making member 114 is in engagement with its marking contact as a result of the previous operation of the transmitter magnet following the last operation of the driving circuit. As a result of this operation, a circuit is completed that extends from ground by way of the contact-making member 114, resting contact of spring 131 of switch K and said spring, and upper winding of relay 148 to battery. The relay 148 is energized to establish a locking circuit for itself at armature 167 over a path that extends from ground by way of back contact and armature 152, keyboard relay 140, armature 167 and its front contact, and lower winding of relay 148 to battery. Another result of the operation of the sending relay 148 is that battery is connected to the conductor 171, extending to the spring 267 of the first selecting relay 218.

It will be recalled that another result of the operation of the relay 142 is that a circuit is completed for the relay 143. The relay 143 is energized to open the circuit of the relay 142 at armature 157, and to establish a locking circuit at armature 158 over a path that extends from ground by way of back contact and armature 265, conductor 185, armature 158 and its front contact, and relay 143 to battery.

When the relay 142 is first energized, a circuit is completed extending from ground by way of front contact and armature 160, conductor 368, back contact and armature 337, armature 332 and its front contact, armature 329 and its back contact, and relay 304 to battery. The relay 304 is energized to establish a circuit for the relay 305 at armature 328 over a path that extends from ground by way of back contact and armature 326, armature 328 and its front contact, relay 305, and relay 304 to battery. The relay 305 remains short-circuited until the original energizing circuit of the relay 304 is opened.

When the relay 143 is operated, as before described, the circuit of the relay 142 is opened, and this relay is deenergized to open the original energizing circuit of the relay 143 at armature 154, to remove ground from the marking contacts, such as 115, at armature 156, and to open the original circuit of the relay 304 at armature 160. As a result of the latter operation, the short-circuit is removed from the relay 305 and this relay is permitted to energize.

The selecting apparatus is normally held in an inoperative condition by the holding circuit that may be traced from ground by way of back contact and armature 330, holding relay 306, conductor 366, back contact and armature 283, trunk conductor 290, armature 457 and its back contact, conductor 564, and holding relay 505 to battery.

The holding relay 306 is energized to open one point in the locking circuit of the relay 303 at armature 331, to prepare a point in the starting circuit at armature 332, to open one point in the circuit of the relay 309 at armature 333, and to complete a circuit at the front contact of this armature over a path extending from ground by way of back contact and armature 327, armature 333 and its front contact, and relay 302 to battery. The relay 302 is energized to establish a locking circuit for itself at armature 324 over a path that extends from ground by way of armature 266 and its back contact, conductor 371, armature 324 and its front contact, and relay 302 to battery. Another result of the operation of the relay 302 is that a circuit is prepared for the relay 309.

At the receiving station, the holding relay 505 is energized to open one point in the locking circuit of the relay 506, to open one point in the circuit of the relay 500 at armature 525, and to complete a circuit at the front contact of this armature over a path that extends from ground by way of back contact and armature 528, armature 525 and its front contact, and relay 504 to battery. The relay 504 is energized to prepare a circuit for the relay 500 at armature 522, and to establish a circuit for itself over a path that extends from ground by way of armature 435 and its back contact, conductor 561, armature 523 and its front contact, and relay 504 to battery.

There are three other normally closed circuits at the transmitting station. The relay 300 is normally energized, as is the relay 301, over circuits that are obvious. The relay 307 is energized over a circuit that extends from ground by way of back contact and armature 280, conductor 367 and relay 307 to battery. The relay 307 is operative to prepare a circuit for the relay 308.

Now, when the holding circuit is opened by the operation of the relay 305, as before described, the holding relays 306 and 505 at the sending and receiving stations, respectively, are deenergized. The relay 306, upon being deenergized, prepares a locking circuit for the relay 303 at armature 331, opens one point in the starting circuit at armature 332, and at armature 333 completes a circuit extending from ground by way of back contact and armature 327, armature 333 and its back contact, relay 309, and front contact and armature 323 to battery. The relay 309 is energized to open another point in the starting circuit at armature 337, and to complete one point in the driving circuit at armature 338.

At the receiving station, the holding relay 505 is deenergized to prepare a locking circuit for the relay 506 at armature 524, and to complete a circuit at armature 525 over a path that extends from ground by way of back contact and armature 528, armature 525 and its back contact, relay 500, and front contact and armature 522 to battery. The relay 500 is energized to complete the driving circuit at armature 516.

The driving circuit is now established over a path that extends from battery by way of back contact and armature 350, line relay 316, back contact and armature 362, back contact and armature 336, armature 338 and its front contact, trunk conductor 370, front contact and armature 516, armature 518 and its back contact, back contact and armature 528, line relay 511, and armature 543 and its back contact to ground. The line relays 316 and 511 are energized over this circuit.

The relay 316 at the transmitting station, upon operating, completes a circuit at armature 335 for the relay 313, and completes a circuit at armature 353 for the relay 314. The relay 314 is energized to open one point in the circuits of the relays 317 and 318 at armature 347, and to complete a circuit at armature 348 that extends from ground upon grounded conductor 371 by way of armature 354 and its back contact, armature 348 and its front contact, relay 315 and relay 314 to battery. This circuit is not effective to cause the energization of the relay 315 so long as the original energizing circuit of the relay 314 is maintained.

The relay 313 is energized to establish a locking circuit for itself at armature 344 to ground upon grounded conductor 371, to open one point in the locking circuit of the relay 312 at armature 345, and to complete a circuit at armature 346 that extends from ground by way of armature 351 and its back contact, armature 346 and its front contact, relay 311, conductor 365, armature 232 and its back contact, counting relay 200, back contact and armature 261, and back contact and armature 263 to battery.

The counting relay 200 is energized to complete a circuit at armature 230 over a path that extends from ground by way of back contact and armature 265, armature 230 and its front contact, relay 201, relay 200, back contact and armature 261, and back contact and armature 263 to battery. This circuit is not effective to energize the relay 201 so long as the original circuit for the relay 200 is maintained.

The relay 311 is energized in series with the counting relay 200. The relay 311 operates to open the circuit of the relay 301. The relay 301 is deenergized to complete a circuit extending from ground by way of armature 321 and its front contact, back contact and armature 322, relay 308 and armature 334 and its front contact to battery. The relay 308 is operated to establish a locking circuit for itself to ground upon grounded conductor 371 at armature 335, and to open the driving circuit at armature 336. The line relays 316 and 511 at the transmitting and receiving stations, respectively, are deenergized.

The deenergization of the relay 316 opens the original energizing circuit of the relays 313 and 314 at armatures 352 and 353, respectively. The short-circuit is, consequently, removed from the relay 315, and this relay is energized in series with the relay 314. The relay 315 operates to open another point in the original circuit for the relay 314 at armature 349, to open another point in the driving circuit at armature 350, to open the impulsing circuit at armature 351, and to complete a circuit at the front contact of this armature for the relay 320.

The relay 320 is energized to disconnect the line relay 316 from the driving circuit at armature 362, to connect the line relay 319 to the driving circuit at the front contact of this armature, and to establish a locking circuit for itself that extends from ground upon grounded conductor 371 by way of back contact and armature 358, armature 363 and its front contact, and relay 320 to battery.

When the impulsing circuit is opened, the short-circuit is removed from the counting relay 201, and this relay is permitted to operate. The relay 201 is energized to prepare an impulsing circuit for the counting relay 208 at armature 231, to open another point in the circuit of the relay 200 at armature 232, and to complete a circuit at armature 233 over a path that extends from ground by way of back contact and armature 265, armature 250 and its back contact, armature 233 and its front contact, armature 281 and its back contact, relay 266, and back contact and armature 263 to battery.

The relay 226 is energized to complete a circuit for the relay 224 at armature 285 over a path that extends from ground by way of said armature and its front contact, back contact and armature 282, and relay 224 to battery, and to complete a circuit at armature 284 over a path that extends from ground by way of back contact and armature 265, armature 284 and its front contact, relay 225, relay 226, and back contact and armature 263 to battery. The circuit for the relay 225 is not effective to cause the operation of this relay, inasmuch as it is shunted by the original circuit for the relay 226.

When the original circuit of the counting relay 200 is opened, the circuit of the relay 311 is also opened and this relay is deenergized to complete a circuit for the relay 301. The relay 301 is operated to open the original energizing circuit of the relay 308.

The relay 224 is operated to remove ground from conductor 367 at armature 280, thereby opening the circuit of the slow-acting relay 307. The slow-acting relay 307 is deenergized, after a short interval of time, to open the circuit of the relay 308. The relay 308 is deenergized to reestablish a point in the driving circuit at armature 336.

At the receiving station, when the line relay 511 is first energized, a circuit is completed at armature 539 for the relay 514, and a circuit is completed at armature 540 for the relay 513. The relay 513 is energized to open one point in the circuits of the relays 509 and 510 at armature 545, and to complete a circuit at armature 546 that extends from ground upon grounded conductor 561 by way of armature 537 and its back contact, armature 546 and its front contact, relay 512 and relay 513 to battery. This circuit is not effective to cause the operation of the relay 512 by reason of the fact that it is shunted by the original circuit of the relay 513.

The relay 514 is energized to open one point in the locking circuit of the relay 515 at armature 548, to complete an impulsing circuit at armature 549, and to establish a locking circuit for itself at armature 547 that extends from ground upon grounded conductor 561 by way of back contact and armature 550, armature 547 and its front contact, and relay 514 to battery.

The previously mentioned impulsing circuit extends from ground by way of back contact and armature 544, armature 549 and its front contact, conductor 565, armature 431 and its back contact, relay 407, back contact and armature 438, and back contact and armature 436 to battery. The counting relay 407 is energized to establish a locking circuit at armature 433 over a path extending from ground by way of back contact and armature 434, armature 433 and its front contact, relay 406, relay 407, back contact and armature 438, and back contact and armature 436 to battery. The relay 406 is short-circuited so long as the original energizing circuit for the relay 407 is maintained.

Now, when the driving circuit is opened by the operation of the relay 308 at the transmitting station, in the manner before described, the line relay 511 is deenergized to open the original energizing circuit of the relay 514 at armature 539, and to remove the short-circuit from the relay 512 at armature 540. The relay 512 is immediately operated to open one point in the original energizing circuit of the relay 513 at armature 542, to complete a circuit for the relay 501 at armature 541, to open another point in the circuit of the relay 511 at armature 543, and to open the impulsing circuit at armature 544. The relay 501 is energized to establish a locking circuit for itself over a path extending from ground upon grounded conductor 561 by way of back contact and armature 533, armature 517 and its front contact, and relay 501 to battery, to prepare a point in the circuit of the relay 508 at armature 518, and to prepare a circuit for the relay 507 at armature 519.

When the impulsing circuit is opened, the short-circuit is removed from the counting relay 406 and this relay is permitted to energize. Upon operating, the relay 406 prepares a point in the circuit of the counting relay 417 at armature 430, opens a point in the original energizing circuit of the relay 407 at armature 431, and at armature 432 completes a circuit extending from ground by way of back contact and armature 434, armature 453 and its back contact, armature 432 and its front contact, armature 456 and its back contact, relay 418, and back contact and armature 436 to battery.

The relay 418 is energized to complete a circuit that extends from ground by way of back contact and armature 434, armature 454 and its front contact, relay 418, relay 419, and back contact and armature 436 to battery. This circuit is not effective to energize the relay 419 until the original circuit of the relay 418 is opened.

Another result of the operation of the relay 418 is that a circuit is completed extending from ground by way of armature 495 and its front contact, armature 496 and its back contact, conductor 562, and relay 502 to battery. The relay 502 is energized to complete a circuit that extends from ground by way of armature 521 and its back contact, front contact and armature 520, front contact and armature 519, and relay 507 to battery. The relay 507 is energized to open another point in the circuit of the relay 511 at armature 528, to complete the driving circuit at armature 529, and to establish a locking circuit for itself at armature 530 over a path that extends from ground upon grounded conductor 561 by way of back contact and armature 533, armature 530 and its front contact, and relay 507 to battery.

The driving circuit now extends from ground by way of back contact and armature 357, line relay 319, front contact and armature 362, back contact and armature 336, armature 338 and its front contact, trunk conductor 370, front contact and armature 516, armature 518 and its front contact, armature 529 and its front contact, line relay 508, and armature 535 and its back contact to battery.

The line relays 319 and 508 are energized in series. The relay 319 is operated to complete a circuit for the relay 312 at armature 360, and to complete a circuit for the relay 317 at armature 361. The relay 317 is energized to open the circuits of the relays 314 and 315 at armature 354, and to prepare a circuit at armature 355 for the relay 318.

The relay 315 is deenergized to prepare a point in the circuit of the relay 314 at armature 349, to prepare a point in the circuit of the relay 316 at armature 350, to open the original energizing circuit of the relay 320 at armature 351, and to prepare a point in the impulsing circuit at the back contact of this armature. The relay 314 is deenergized to open another point in the circuit of the relay 315 at armature 348, and to complete a circuit at armature 347 extending from ground upon grounded conductor 371 by way of back contact and armature 347, armature 355 and its front contact, relay 318, and relay 317 to battery. This circuit is not effective to energize the relay 318 so long as the original energizing circuit of the relay 317 is maintained.

The relay 312 is energized to open the locking circuit of the relay 313 at armature 341, to prepare a locking circuit for itself at armature 342, and to complete an impulsing circuit at armature 343. The relay 313 is deenergized to open one point in the impulsing circuit at armature 346, and to establish the locking circuit of the relay 312 at armature 345 to ground upon grounded conductor 371.

The previously mentioned impulsing circuit extends from ground by way of back contact and armature 359, armature 343 and its front contact, relay 310, conductor 364, front contact and armature 231, armature 252 and its back contact, relay 208, back contact and armature 261, and back contact and armature 263 to battery. The relay 208 is energized to open the original circuit of the relay 226 at armature 250, and to establish a circuit for the relay 209 extending from ground by way of back contact and armature 265, armature 250 and its front contact, relay 209, relay 208, back contact and armature 261, and back contact and armature 263 to battery. The circuit for the relay 209 is not effective by reason of the fact that it is shunted by the original energizing circuit of the relay 208.

When the original energizing circuit of the relay 226 is opened, the circuit for the relay 225 becomes effective, and this relay is energized in series with the relay 226. The relay 225 operates to open another point in the original energizing circuit of the relay 226 at armature 281, to open the circuit of the relay 224 at armature 282, to open one point in the holding circuit at armature 283, and to prepare a signalling circuit at the front contact of this armature. The relay 224 is deenergized to complete a circuit for the slow-acting relay 307. relay 307.

The slow-acting relay 307 is energized to prepare a circuit for the relay 308. The relay 310 is energized in series with the counting relay 208 over the previously traced impulsing circuit. The relay 310 operates to open the original energizing circuit of the relay 300. The relay 300 is deenergized to complete a circuit that extends from ground by way of armature 321 and its back contact, front contact and armature 322, relay 308, and armature 334 and its front contact to battery. The relay 308 is energized to establish a locking circuit for itself at armature 335, and to open the driving circuit, including the line relays 319 and 508, at armature 336.

The relay 319 is immediately deenergized to remove the short-circuit from the relay 318. The relay 318 is operative to open another point in the circuit of the relay 317 at armature 356, to open another point in the circuit of the relay 319 at armature 357, to open the locking circuit of the relay 320 at armature 358, and to open the impulsing circuit at armature 359. The relay 320 is deenergized to connect the line relay 316 to the driving circuit.

By the opening of the impulsing circuit, the short-circuit is removed from the counting relay 209. The counting relay 209 is, consequently, operated to prepare an impulsing circuit for the counting relay 202 at armature 251, to open another point in the original energizing circuit of the relay 208 at armature 252, and to complete a circuit at armature 253 over a path that extends from ground by way of back contact and armature 265, armature 234 and its back contact, armature 253 and its front contact, and selecting relay 218 to battery. The selecting relay 218 is energized to complete a circuit for the relay 224 at spring 268, and to prepare a signalling circuit at spring 267.

Another result of the opening of the impulsing circuit is that the relay 310 is deenergized to complete a circuit at armature 339 for the relay 300. The relay 300 is energized to open the original energizing circuit of the relay 308 at armature 321. The relay 224 is energized to open the circuit of the slow-acting relay 307. The slow-acting relay 307 is deenergized, after a short interval of time, to open the locking circuit of the relay 308. The relay 308 is deenergized to reestablish one point in the driving circuit.

At the receiving station, the line relay 508 is, as before described, energized in series with the line relay 319. The line relay 508 operates to complete a circuit at armature 531 for the relay 515, and to complete a circuit at armature 532 for the relay 510. The relay 510 is energized to open the circuits of the relays 512 and 513 at armature 537, and to prepare a circuit for the relay 509 at armature 538.

The relay 512 is deenergized to open the original energizing circuit of the relay 501 at armature 541, to prepare a circuit for the relay 513 at armature 542, to prepare a circuit for the relay 511 at armature 543, and to close one point in the impulsing circuit at armature 544. The relay 513, upon retracting its armature, opens one point in the circuit of the relay 512 at armature 546, and at armature 545 completes a circuit extending from ground upon grounded conductor 561 by way of back contact and armature 545, armature 538 and its front contact, relay 509, and relay 510 to battery. This circuit does not energize the relay 509 until the original energizing circuit of the relay 510 is opened.

The relay 515 is operated to open the locking circuit of the relay 514 at armature 550, to prepare a locking circuit for itself at armature 551, and to complete an impulsing circuit at armature 552. The relay 514 is deenergized to open one point in the impulsing circuit at armature 549, and to complete the locking circuit of the relay 515 to ground upon grounded conductor 561 at armature 548.

The previously mentioned impulsing circuit extends from ground by way of back contact and armature 536, armature 552 and its front contact, conductor 566, front contact and armature 430, armature 451 and its back contact, relay 417, back contact and armature 438, and back contact and armature 436 to battery. The relay 417 is energized to open the original energizing circuit of the relay 418 at armature 453, and to establish a circuit for the relay 416 at the front contact of this armature over a path that extends from ground by way of back contact and armature 434, armature 453 and its front contact, relay 416, relay 417, armature 438 and its back contact, and back contact and armature 436 to battery. The relay 416 is not energized over this circuit until the original energizing circuit of the relay 417 is opened.

By the opening of the original energizing circuit of the relay 418, the short-circuit is removed from the relay 419, and this relay is permitted to operate. Upon operating, the relay 419 opens another point in the original energizing circuit of the relay 418 at armature 456, opens one point in the holding circuit at armature 457, prepares a point in the signalling circuit at the front contact of this armature, and at armature 496 removes ground from conductor 562, thereby opening the circuit of the relay 502. The relay 502 is deenergized to open the original energizing circuit of the relay 507. The relay 507 remains operated, however, by reason of the fact that its locking circuit is still completed.

When the driving circuit is opened by the operation of the relay 308, in the manner before described, the relay 508 is deenergized at the same time that the relay 319 at the transmitting station is deenergized. The operation of the relay 508 removes the short circuit from the relay 509. The relay 509 immediately operates to open the impulsing circuit at armature 536, to open another point in the circuit of the relay 508 at armature 535, to open another point in the original energizing circuit of the relay 510 at armature 534, and to open the locking circuits of the relays 501 and 507 at armature 533. The relay 501 is deenergized to prepare a point in the driving circuit at armature 518, and to open another point in the original energizing circuit of the relay 505 at armature 519. The relay 507 is deenergized to prepare a point in the driving circuit at armature 528.

When the impulsing circuit is opened, the short-circuit is removed from the counting relay 416, and this relay is operated to prepare a circuit for the relay 405 at armature 450, to open another point in the original energizing circuit of the relay 417 at armature 451, and to complete a circuit at armature 452 extending from ground by way of back contact and armature 434, armature 429 and its back contact, armature 452 and its front contact, and selecting relay 425 to battery. The selecting relay 425 is energized to connect ground to conductor 563 at armature 460, and to complete a signalling circuit at armature 461. The relay 503 is energized to prepared a point in the circuit of the relay 507 at armature 521.

Inasmuch as the circuits of the line relays 319 and 508 are opened at the same time by the operation of the relay 308, the selecting relays 218 and 425 are energized simultaneously. By the operation of these selecting relays, there is a signalling circuit completed from battery by way of front contact and armature 168, conductor 171, armature 267 and its front contact, front contact and armature 283, trunk conductor 290, armature 457 and its front contact, resting contact of spring 461 and said spring, conductor 490, selecting relay 622, and normally closed springs controlled by armature 660 to ground.

The selecting relay 622 is energized to establish a locking circuit for itself over a path extending from battery by way of relay 627, armature 671 and its front contact, relay 622, and normally closed springs controlled by armature 660 to ground. The release control relay 627 is energized to prepare a printing circuit at armature 680.

Another result of the operation of the relay 682 is that a circuit is completed for the selecting magnet 611. The selecting magnet 611 is energized and operates in the usual manner to permit a disc in the type printer to move into a predetermined position.

Now, when the relay 308 is deenergized, as before described, to close the driving circuit, the line relays 316 and 511 are energized in series.

At the transmitting station, the line relays 316 and 319 are alternately connected to the driving circuit and control the operation of certain other relays in causing the energization of the counting relays 202, 203, 210, 211, 204, 205, 212, 213, 206, 207, 214 and 215 in the sequence mentioned. The operation of the counting relays causes the energization and deenergization of the selecting relays 219, 220, 221, 222 and 223 in the sequence mentioned.

At the receiving station, the line relays 511 and 508 are alternately connected to the driving circuit to cause the operation of the counting relays 405, 404, 415, 414, 403, 402, 413, 412, 401, 400, 411 and 410 in the sequence mentioned. The operation of these counting relays controls the energization and deenergization of the selecting relays 424, 423, 422, 421, and 420 in the sequence mentioned. The functioning of the driving circuit at both the transmitting and receiving stations to produce the operations of these relays is thought to be obvious from the previous description. The corresponding selecting relays at each station are, of course, energized simultaneously.

As no other sending relays in the tape transmitter have been energized, no other signalling circuit is closed. Of course, this only occurs for a certain definite character. Other characters may complete 2, 3, 4 or 5 signalling circuits and cause corresponding operations in the type printer. That is, they may control the energization of 1, 2, 3, 4 or 5 selecting relays, or combinations of these selecting relays, to produce operations of the so-called interference plates in the printer. The operation of these selecting magnets in the printer causes the movement of the interference plates to place a stop in a certain definite position in the path of the type wheel. This is so that, when the printing impulse is received, the proper character will be typed by the operation of a plunger pushing the paper into engagement with the type wheel. The operations of the printer are thought to be well known and, consequently, have only been briefly mentioned.

When the selecting relay 223 at the transmitting station is energized by the operation of the counting relay 207, the selecting relay 420 at the receiving station will be simultaneously operated by the operation of the counting relay 400. The operation of the relay 223 completes a circuit for the relay 224 at spring 291, places battery upon the conductor 170 at spring 290', and at spring 292 completes a circuit extending from battery by way of said spring and its working contact, front contact and armature 283, trunk conductor 290, armature 457 and its front contact, working contact of spring 492 and said spring, conductor 495, printer relay 618, and back contact and armature 663 to ground. The printer relay 618 is energized to complete a circuit for the release magnets 616 and 617, and to prepare a circuit at armature 662 that may be used for operating a relay 610 of a reperforator in the event that it is desired to relay the message.

Certain combinations of characters operate what are termed "stunt" relays to control the various functioning of the apparatus. The interference plates, in operating, cause paths to be prepared for operating the springs 630 to 640, inclusive, to control various functions. That is, the spring 630 controls the operation of a bell in accordance with a certain signal combination to call the attention of the receiving operator.

The relay 601 is operated to cause the relaying of the message. The relay 602 is employed to unlock the relay 601. The magnet 603 is a carriage release magnet; the magnet 604 is a shift magnet; the magnet 605 is a line feed magnet; the relay 606 is a space lock relay; the magnet 607 is a spacer magnet; the magnet 608 is a starter magnet; and the magnet 609 is a printer magnet.

Upon the operation of the release magnet 617, the locking circuit of the relay 622, and also the circuit of the relay 627, is opened. These relays are, consequently, deenergized. Another result of the operation of the armature 660 of the release magnet 617 is that a circuit is completed for the overlap relay 620. The overlap relay 620 is energized to complete a circuit for the starter magnet, which operates to release the type shaft. Upon making contact between the striking arm of the type shaft and the stop bar 642, a circuit is completed for the printer magnet 609 through the space lock relay and the clear-out relay to battery. The relays 609, 606 and 618 are energized. The printer magnet 609 causes the printing of the letter.

The space lock relay 606, upon energizing, completes a locking circuit for itself at armature 653, and at armature 652 completes a circuit for the spacer magnet 607. The spacer magnet 607 is operated to open the locking circuit of the relay 606. The operation of the overlap relay 620 also opens the circuits of the selecting magnet 611 before the relay 622 is deenergized.

It will be seen that the overlap relay 620 functions to permit increased speed by bringing about the release of the selecting relays after they have functioned and before a character is printed. The selecting relays are thus free to receive a new set of impulses while the printer is operating. The deenergization of the selecting magnets that may be energized does not release the selected letter by reason of the fact that the stop bar remains in the slots of the interference plates or selecting discs.

As the selecting relays 622 to 627, inclusive, are operated by succeeding impulses for a new character, their operation does not cause the functioning of the selecting magnets until the overlap relay 620 is deenergized. When the printing cycle of the first character is completed, the overlap relay is deenergized and the selecting magnets are permitted to operate. The reception of a printing impulse will cause the energization of the relay 618 and the functioning of the type printer, as before.

At the transmitting station, it will be recalled that the operation of the selecting relay 223 brought about the energization of the relay 224. The relay 224 is operated to open the circuit of the slow-acting relay 307. The relay 307 is deenergized to open the locking circuit of the relay 308. The relay 308 is deenergized to complete the driving circuit.

Another result of the operation of the selecting relay 223 is that battery is placed upon the conductor 170. As a result of this operation, there is a circuit completed for the relay 141. The relay 141 is energized to open the circuit of the keyboard relay 140 and the circuit of the selecting relay 148. The selecting relay 148 is deenergized to remove battery from the conductor 171 that extends to the spring 267 of the selecting relay 218. Of course, if other selecting relays were operated, as in the case of a different character, these relays would also be deenergized with the consequent disconnection of the battery from the contacts of the various selecting relays.

The driving circuit is now completed and the line relays 316 and 511 are energized in series. The operation of these relays controls the energization of the counting relays 214 and 411 at the transmitting and receiving stations, respectively. As a result of the operation of the relay 214, the circuit of the selecting relay 223 is opened at armature 260, and a circuit is prepared at the front contact of this armature for the relay 215. The selecting relay 223 is deenergized to remove battery from the conductor 170, thereby opening the circuit of the lock-out relay 141. This relay is deenergized to prepare a circuit for the starting relay 142.

When battery is first placed upon the conductor 170 by the operation of the selecting relay 223, a circuit is completed for the transmitter magnet 105 of the tape transmitter in multiple with the circuit for the lockout relay 141. When the selecting relay 223 is deenergized, the circuit of the magnet 105 is opened. The magnet 105 is energized to withdraw the selecting pins, such as 109, from contact with the tape and to advance the feed wheel 119 one step. By the deenergization of the magnet 105, the five selecting pins are permitted to contact with the tape and the pawl 111' is operated to position itself, by the action of spring 118, so as to be in a position to advance the feed wheel upon the next operation of the magnet. The selecting pins that penetrate the holes in the tape determine the contact-making members 114 that are brought into engagement with their respective marking contact members 115. This, in turn, determines what selecting relays will be operated upon the next energization of the starting relay 142.

Another result of the operation of the relay 223 is that the circuit of the relay 224 is opened. The relay 224 is thereupon deenergized to complete a circuit at armature 280 for the slow-acting relay 307. The slow-acting relay 307 is energized to complete a circuit for the relay 308. The relay 308 operates to open the driving circuit, including the line relays 316 and 511.

The relay 316 is deenergized to bring about the removal of the short-circuit from the counting relay 215. The counting relay 215 is energized to open another point in the original energizing circuit of the relay 214 at armature 262, and to remove the short-circuit from the slow-acting relay 216 at armature 261, thereby permitting this relay to be energized in series with all the counting relays 200 to 215, inclusive, and also in series with the relays 225 and 226.

The relay 216 is energized to complete a circuit at armature 264 for the slow-acting relay 217. The slow-acting relay 217 is energized to open the circuits of the relays 200 to 216, inclusive, and the relays 225 and 226 at armature 265, to remove ground from conductor 371 at armature 266, and to place ground upon conductor 369 at the front contact of this armature. The counting relays 200 to 215, inclusive, are immediately deenergized to restore certain circuits to normal. The relays 225 and 226 are deenergized. The relay 225 operates to prepare a circuit for the relay 226 at armature 281, to prepare a circuit for the relay 224 at armature 282, and to prepare a holding circuit at armature 283. The relay 216 is deenergized to open the circuit of the relay 217.

When ground is removed from the conductor 371, the locking circuit of the relay 308 is opened, as well as the locking circuits of the relays 313, 314, 315 and 302. These relays are deenergized. The deenergization of the relays 313, 314, 315 and 308 restores certain circuits to normal. The deenergization of the relay 302 opens the circuit of the relay 309. The relay 309 is deenergized to prepare a starting circuit at armature 337, and to open one point in the driving circuit at armature 338.

When ground is connected to conductor 369, a circuit is completed for the relay 303. The relay 303 is energized to establish a locking circuit for itself at armature 325, to open the circuits of the relays 304 and 305 at armature 326, and to open another point in the circuit of the relay 309 at armature 327. The relay 304 is deenergized to open one point in the circuit of the relay 305. The relay 305 is deenergized to prepare a starting circuit at armature 329, and to prepare a holding circuit at armature 330. The slow-acting relay 217 is deenergized, after a short interval of time, to open the original energizing circuit of the relay 303.

The operation of the line relay 511, at the receiving station, brings about the energization of the relay 411. The relay 411 is energized to open the circuit of the selecting relay 420 at armature 440, and to prepare a circuit for the relay 410 at the front contact of this armature. When the driving circuit is opened by the operation of the relay 308, in the manner described before, the relay 511 is deenergized to bring about the operation of the relay 512. The energization of the relay 512 removes the short-circuit from the relay 410.

The relay 410 is energized to remove the short-circuit from the relay 409. The relay 409 is energized in series with the relays 400 to 407, inclusive, and 410 to 417, inclusive. The relay 409 operates to complete a circuit for the relay 408. The relay 408 is energized to open the circuits of the relays 400 to 407, inclusive, 409 to 417, inclusive, and 418 and 419 at armature 434, to remove ground from conductor 561 at armature 435, and to place ground upon conductor 560 at the front contact of this armature. The relays 400 to 407, inclusive, are deenergized, as are the relays 410 to 417, inclusive. The relays 418 and 419 also retract their armatures. The relay 409 is deenergized to open the circuit of the slow-acting relay 408.

By the removal of ground from conductor 561, the locking circuits of the relays 504, 512, 513 and 514 are opened. The relays 512, 513 and 514 are deenergized to restore certain circuits to normal. The relay 504 is deenergized to open the circuit of the relay 500. The relay 500 is deenergized to open one point in the driving circuit.

The deenergization of the selecting relay 420 occurs upon the energization of the counting relay 411. The deenergization of this relay opens the signalling circuit, and also opens the circuit of the relay 502. The relay 502 is deenergized to open one point in the circuit of the relay 507. Another result of the deenergization of the relay 512 is that the circuit of the relay 501 is opened. The relay 501 is deenergized to prepare certain points in the driving circuit.

By the connection of ground to conductor 560, a circuit is completed for the relay 506. The relay 506 is energized to establish a locking circuit for itself at armature 526, and to open one point in the circuit of the relay 500 at armature 528. The slow-acting relay 408 is deenergized, after a short interval of time, to open the original energizing circuit of the relay 506.

A holding circuit is now established that extends from ground by way of back contact and armature 330, holding relay 306, conductor 366, back contact and armature 283, trunk conductor 290, armature 457 and its back contact, conductor 564, and holding relay 505 to battery. The holding relays 306 and 505 are energized in series.

The holding relay 306 is operated to open the locking circuit of the relay 303 at armature 331, to prepare a circuit for the starting relay 304 at armature 332, and to prepare a circuit at armature 333 for the relay 302. The relay 303 is deenergized to prepare a circuit for the relay 305 at armature 326, and at armature 327 completes a circuit extending from ground by way of back contact and said armature, armature 333 and its front contact, and relay 302 to battery. The relay 302 is energized to establish a locking circuit itself at armature 324, and to prepare a circuit for the relay 309 at armature 323.

At the receiving station, the holding relay 505 is energized to open the locking circuit of the relay 506 at armature 524, and to prepare a circuit for the relay 504 at armature 525. The relay 506 is deenergized to complete a circuit for the relay 504 at armature 528. The relay 504 is energized to establish a locking circuit for itself at armature 523, and to prepare a circuit for the relay 500 at armature 522. In this manner, the selecting apparatus that takes the place of the synchronously-operating distributers at the receiving and transmitting stations is restored to normal.

When the slow-acting relay 217 at the transmitting station is energized, it will be seen that the operation of the armature 265 removes ground from the conductor 185. The disconnection of ground from this conductor opens the locking circuit of the starting relay 143. The starting relay 143 is, consequently, deenergized. As a result of the deenergization of this relay, there is a circuit completed for the relay 142.

The operation of the relay 142 brings about the functioning of the driving circuit, in the manner previously described, to complete the cycle of operations of the relays in the selecting relay groups at the transmitting and receiving stations. These functions occur in substantially the same manner as before and the type printer at the receiving station is operated in accordance with the set up character.

The speed of the selecting relays under the control of the driving circuit is very high, it being possible to operate the six relays constituting the selecting apparatus in a fraction of a second. Thus, it will be clear that the selecting relays, together with the driving circuit, will function at a higher speed and more advantageously than the synchronously-operating distributers formerly used.

It will be obvious that all the functions that are incorporated in the ordinary tape transmitter may be employed in the present system without any deviation from standard practice. To illustrate, if it is desired to repeat any definite character, the switch 195 will be operated. As a result of this operation, upon battery being placed on conductor 140, no operation of the transmitter magnet 105 occurs and the same character will be repeated by the functioning of the apparatus in the manner described. Other features are just as readily taken care of.

Attention is directed to the fact that the line relays 316 and 319 at the transmitting station and the line relays 511 and 508 at the receiving station must be connected to the driving circuit alternately in order to cause proper operation of the counting relays. The counting relays at the transmitting station must be energized in the proper sequence in order to control the operation of the relays 310 and 311 and the relays 300 and 301. That is, if both these relays are energized at the same time by reason of some trouble in the circuit, the relays 300 and 301 will be energized simultaneously and there will be no circuit completed for the relay 308. Consequently, this relay remains deenergized and the driving circuit will not function.

The provision of the relays 310 and 311 also insures that the counting relays must be energized because, before the relays 310 and 311 can be operated, there is a circuit through them for the counting relays. The counting relays must operate in order to cause the operation of the selecting relays. The selecting relays, in turn, must operate in order to control the relay 224 which, in turn, brings about the operation of the slow-acting relay 307. The relay 307 controls the operation of the relay 308 which opens the driving circuit. This interconnection of circuits insures positive operation of the selecting apparatus.

At the receiving station, also, it will be obvious that these line relays must be alternately connected to the driving circuit in order to cause proper functioning of the selecting apparatus.

Attention is also directed to the fact that the speed at which the driving circuit is operated is controlled by the slow-acting relay 307. As the time constant of this relay may be changed at the will of the operator at the transmitting station, the speed of the driving circuit is under the control of the operator.

Another feature of the invention resides in the provision of the relays 302 and 504 at the transmitting and receiving stations, respectively. It will be seen that, at the end of each cycle of the selecting apparatus, the relay 302 is connected across the battery. Unless the voltage of the battery is sufficiently high to bring about the energization of this relay, the starting relay cannot function to cause the initiation of the operation of the driving circuit. It will be understood that these relays may be specially constructed so that they will not operate their armatures when the electromotive force of the battery falls below a predetermined voltage.

It will be recalled that it was stated, in the preliminary part of the specification, that the selecting apparatus might be controlled directly from the keyboard of the tape perforator. To bring about this result, the switch K will be operated so that the springs 125 to 135, inclusive, assume a position opposite from that shown in the drawings. The operation of these circuits associates the selecting relays with the springs 100 to 104, inclusive. The springs 100 to 104, inclusive, are controlled directly from the keyboard perforator. That is, one or more of these springs, depending upon the letter that it is desired to send, is caused to engage their working contacts. The operation of the invention when the signals are sent directly from the keyboard will be obvious without further description.

My invention is not limited to the particular arrangement of the apparatus described, but may be variously modified without departing from the spirit and scope thereof, as set forth in the appended claims.

I claim as my invention:

1. In a telegraph system, the combination with a first and second station, of automatic transmitting apparatus at the first station and automatic receiving apparatus at the second station, a trunk line connecting said stations, a holding circuit extending from said first station to said second station over said trunk line, and means for interrupting the holding circuit to initiate the operation of the automatic transmitting and receiving apparatus.

2. In a telegraph system, the combination with a first and second station, of automatic transmitting apparatus at the first station and automatic receiving apparatus at the second station, a trunk line connecting said stations, a holding circuit extending from said first station to said second station over said trunk line, and means controlled by the automatic transmitting apparatus for interrupting the holding circuit to initiate the operation of the automatic transmitting and receiving apparatus.

3. In a telegraph system, a transmitting station having a transmitter, a receiving station having a receiver, a relay chain distributor at each of said stations, a signalling line connecting said stations, a drive line connecting said stations, means for transmitting positive and negative impulses alternately over said drive line, means responsive to said impulses for operating said relay chains in synchronism, means responsive to the synchronous operation of said distributors for controlling said impulse transmitting means, means including said relay chain distributors and controlled by said transmitter for transmitting code combination of impulse conditions from said transmitting station to said receiving station over said signalling line and means including the relay chain distributor at the receiving station for operating said receiver in accordance with said received code combination of impulse conditions.

4. In a telegraph system, a transmitting station, having a transmitter, a receiving station having a receiver, a chain of relays at each of said stations, a signalling line connecting said stations, a transmitter at said transmitting station and a receiver at said receiving station, a drive line connecting said stations, said relay chains being arranged in groups, means for transmitting an impulse over said drive line, means responsive to said impulse for operating a first relay in the chain at each of said stations, means responsive to the operation of said relay at each of said stations for conditioning a relay in another group for operation in response to the next impulse over said drive line, means controlled by energization of said first relays in the chains for transmitting a second impulse over said drive line, means whereby the succeeding impulses transmitted over said drive line can operate only relays in different groups, whereby said relay chains are operated in synchronism, means including said relay chains at the transmitting station and controlled by the transmitter for transmitting code combinations of impulse conditions over said signalling line, and means including said relay chains for operating said receiver in accordance with code combinations of impulses transmitted by said transmitter over said signalling line.

5. In a telegraph system, a transmitting station, a receiving station, distributors comprising a chain of relays at each of said stations, said chains of relays being arranged in groups, means whereby the relays in one of said groups are responsive to impulses of one polarity and the relays of the other group responsive to the impulses of the opposite polarity, a drive line connecting said stations, means for transmitting successive impulses of opposite polarity over said drive line, means responsive to the impulses of opposite polarity whereby relays in different groups are operated successively, means responsive to the energization of relays in different groups successively for operating said impulse transmitting means whereby said relay chains at each station are maintained in synchronism, a transmitter at said transmitting station, a receiver at said receiving station, a signalling line connecting said stations, means including said transmitter and said transmitting station distributor for transmitting code combinations of impulse conditions from said transmitting station to said receiving station over said signalling line and means including said receiving station distributor for operating said receiver in accordance with said received code combinations of impulse conditions.

6. In a telegraph system, a transmitting station having a transmitter, a receiving station having a receiver, distributors comprising a chain of relays at each of said stations arranged in groups, a drive line connecting said stations, relays of one of said groups being arranged to operate in response to impulses of a predetermined polarity transmitted over said drive line and the relays of the alternate group being arranged to respond to impulses of the opposite polarity, transmitted over said drive line, means for transmitting an impulse of a predetermined polarity over said drive line, means responsive to said impulse for operating a relay in one of said chains at each of said stations, means controlled by said energized relays for transmitting an impulse of opposite polarity over said drive line, means responsive to the impulse of opposite polarity for energizing a relay of another group in said chains, a signalling line connecting said stations, means including said transmitting station distributor and controlled by said transmitter for transmitting code combinations of impulse conditions over said signalling line, and means including said receiving station distributor for operating said receiver in accordance with said transmitted code combinations of impulse conditions.

7. In a telegraph system, a transmitting station having a transmitter, a receiving station having a receiver, distributors comprising a chain of relays at each of said stations arranged in groups, a drive line connecting said stations, a drive line relay associated with each of said groups of relays, means including an impulse of a predetermined polarity transmitted over said drive line, one of said drive line relays at each of said stations being associated with said drive line, said drive line relays being responsive to said impulse for operating a relay in their associated groups, means responsive to the energization of the relays in associated groups at each station for transmitting an impulse of opposite polarity over said drive line and for associating the other of said drive line relays with said drive line, whereby said other drive line relays are energized in response to said second drive line impulse, means responsive to the energization of said other drive line relays for energizing a relay in its associated group, whereby said relay chains are operated in synchronism, a signalling line connecting said stations, means including said transmitting station distributor and controlled by said transmitter for transmitting code combinations of impulses over said signalling line to said receiver and means including said receiving station distributor for operating said receiver in accordance with code combinations of impulses.

8. In a telegraph system, a transmitting station, a receiving station having a receiver, a distributor at each of said stations comprising a chain of relays, each of said chains of relays being arranged in groups, means including said distributors for transmitting code combinations of impulse conditions from said transmitting station to said receiving station and means including said distributor at said receiving station for distributing said impulses to said receiver at said receiving station.

9. In a telegraph system, a transmitting station, a remote receiving station, a signalling line connecting said stations, a distributor at each of said stations, a transmitter at said transmitting station, a receiver at said receiving station, means including said transmitting station distributor and controlled by said transmitter for transmitting code combinations of impulses from said transmitting station to said receiving station over said signalling line, means including said distributor at said receiving station for distributing said received impulses to said receiver whereby said receiver is operated in accordance with said received code combinations of impulses, a drive line connecting said stations, means for transmitting drive impulses over said line for operating said transmitting and receiving distributor step by step and means whereby said impulses are originated at said transmitting station and terminated at said receiving station whereby said distributors are maintained in synchronism.

In testimony whereof, I have hereunto subscribed my name this 18th day of February, 1925.

THOMAS U. WHITE.